United States Patent
Kiiskila et al.

[11] Patent Number: 6,146,604
[45] Date of Patent: Nov. 14, 2000

[54] METHOD OF REMOVING NITROGEN OXIDES FROM RECOVERY BOILER FLUE GASES

[75] Inventors: Erkki Kiiskila, Karhula; Pia Kilpinen, Turku; Kari Saviharju, Espoo; Esa Vakkilainen, Varkaus, all of Finland

[73] Assignee: Andritz-Ahlstrom Oy, Espoo, Finland

[21] Appl. No.: 09/309,588

[22] Filed: May 11, 1999

[30] Foreign Application Priority Data

May 11, 1998 [FI] Finland ..................................... 981046

[51] Int. Cl.[7] ............................. C01B 21/20; D21C 11/06
[52] U.S. Cl. ........................... 423/235; 422/185; 422/193
[58] Field of Search ..................................... 423/235, 210; 422/173, 185

[56] References Cited

U.S. PATENT DOCUMENTS

| 5,112,587 | 5/1992 | von Wedel et al. .................... 423/235 |
| 5,325,796 | 7/1994 | Garcia-Mallol ......................... 110/245 |
| 5,344,629 | 9/1994 | Engstrom . |
| 5,378,443 | 1/1995 | Engstrom et al. . |
| 5,454,908 | 10/1995 | Olausson . |
| 5,639,434 | 6/1997 | Patrikainen et al. . |
| 5,670,122 | 9/1997 | Zamansky et al. ..................... 423/210 |
| 5,701,829 | 12/1997 | Raak . |

FOREIGN PATENT DOCUMENTS 48-032766  5/1973  Japan .
48-083069  11/1973  Japan .

OTHER PUBLICATIONS

Grace et al, "Alkaline Pulping", Pulp and Paper Manufacture, Third Edition, vol. 5, ©1989, pp. 532, 533.

*Primary Examiner*—Steven P. Griffin
*Assistant Examiner*—Elin A Warn
*Attorney, Agent, or Firm*—Nixon & Vanderhye P.C.

[57] ABSTRACT

A method of removing nitrogen oxides from flue gases of a cellulose pulp mill recovery boiler does so in a cost effective and environmentally friendly manner. In the heat recovery section of the recovery boiler, a peroxide solution (e.g. a water solution containing about 1–35% hydrogen peroxide) is brought into contact with (e.g. sprayed into) the flue gases in the heat recovery section, so that the flue gases and the peroxide remain in contact between about 0.5–5 (preferably between about 1–2) seconds. The majority (e.g. about 60–90%) of the nitrogen oxides are converted to nitrogen dioxide. The temperature of the flue gases at the time of contact with the peroxide solution is between about 300–800° (preferably 400–600°) C. The nitrogen dioxide is removed by scrubbing the flue gases, downstream of the recovery boiler, with an alkaline liquid (e.g. a liquid otherwise used in the pulp mill having a pH of greater than 9) to convert the majority of the nitrogen dioxides into nitrate. The nitrate may be used as a nutrient in a biological effluent treatment plant within the pulp mill.

18 Claims, No Drawings

METHOD OF REMOVING NITROGEN OXIDES FROM RECOVERY BOILER FLUE GASES

BACKGROUND AND SUMMARY OF THE INVENTION

The present invention relates to a method of removing nitrogen oxides from flue gases of a recovery boiler of a cellulose pulp mill in a cost effective and environmentally friendly manner.

The waste liquor produced during the production of chemical cellulose pulp in the pulp and paper industry, i.e. black liquor, is usually burned in a recovery boiler to recover chemicals and heat. In a conventional recovery boiler, the process chemical is recovered by spraying the black liquor into a furnace. When the liquor enters the boiler it dries quickly and is burned under reducing conditions, producing smelt which is removed from the boiler. The combustion air is usually introduced into the boiler at three different levels so as to provide reducing conditions at first and oxidizing conditions thereafter. Primary air is introduced into the lower section of the furnace, secondary air above the level of the primary air but below the liquor nozzles, and, in order to secure complete combustion, tertiary air above the liquor nozzles. These three air levels are typically the basic air levels in a modern recovery boiler, but the boiler may also have other air levels. A recovery boiler with multiple air introduction levels is shown in U.S. Pat. No. 5,701,829 and "Pulp and Paper Manufacture," Third Edition, Volume 5, ©1989, by Grace et al, FIG. 482, page 533 20 (the disclosures of which are hereby incorporated by reference herein).

In the combustion of black liquor, a large volume of flue gases is produced, which gases contain various impurities, such as nitrogen oxides (NOXs). The $NO_x$ compounds originate either from the thermal oxidation of the nitrogen in the combustion air, or from the release of the nitrogen bound in the fuel and the following oxidation. In the reducing conditions prevailing in the furnace of the recovery boiler, the nitrogen fed into the furnace is converted during the combustion processes into ammonia and nitrogen compounds ending up in the chemical smelt. During conventional combustion, or in conventional combustion effected with staged oxidation (i.e. air is introduced in several different stages as described above) the ammonia forms low $NO_x$ combustion molecular nitrogen and nitrogen oxides that are harmful to the environment. Typically, half of the ammonia identified above is converted into nitrogen oxides and the other half to nitrogen gas. By the low $NO_x$ combustion (with staged air feed when the understoichiometric conditions turn to overstoichiometric conditions in the final combustion), the conversion of the ammonia to nitrogen may be reduced, typically by about 20%.

Methods, which try to reduce the $NO_x$ content of recovery boilers burning black liquor by changing the ratios and the location of the introduction points of combustion air in the direction of the combustion process, have been disclosed for example in U.S. Pat. No. 5,454,908. According to the method therein, the retention time of flue gases in the furnace under understoichiometric conditions has been prolonged so that the last introduction of combustion air takes place at least ten meters above the liquor feed level. This method requires the boiler to have a certain height in order to maintain the reducing conditions for a sufficiently long time.

Some methods of reducing the $NO_x$ emissions from boilers are based on the use of ammonia or urea. A known method of reducing the amount of nitrogen oxides produced during combustion is based on introduction of ammonia into the process in the upper part of the furnace, or after the furnace, within a precise temperature window so that a selective reaction between ammonia, oxygen and nitrogen oxide takes place, producing nitrogen gas and steam. The use of this method is limited to a temperature window of below 1050° C., which is very difficult to control, and it requires introduction of ammonia (or some other nitrogen-based chemicals), which are difficult to treat, into the flue gases.

Finnish patent application no 951690 discloses a method in which additional fuel is introduced into the black liquor recovery boiler above the liquor level. The material to be added comes from the pulp manufacturing process and may be, for example, a malodorous gas or soap. These additional fuels contain hydrocarbons or hydrocarbon compounds which, when burning, generate hydrocarbon radicals, intensifying the reactions of $NO_x$ compounds, and thus reducing the amount of $NO_x$ compounds.

Also the use of other chemicals to remove nitrogen oxides from the flue gases of a recovery boiler has been suggested. According to the method of U.S. Pat. No. 5,639,434, chlorine dioxide or ozone is introduced into the flue gases (immediately before the flue gas scrubber subsequent to the recovery boiler) in order to oxidize nitrogen oxide to nitrogen dioxide. After this the flue gases are scrubbed in a gas scrubber in order to reduce nitrogen oxide to nitrogen for example with green liquor, which has been oxidized or sulphited. This method requires increasing the use of chlorine chemicals in the pulp mill, which is undesirable environmentally and to facilitate process effectiveness. On the other hand, ozone is an expensive chemical. Further, green liquor must be treated before it is used in gas scrubbing.

According to the present invention there is provided a method by which the nitrogen oxides of the flue gases from the recovery boiler of a pulp mill may be removed in an economical, simple, and environmentally friendly manner.

The method of the invention basically provides introduction of a peroxide solution (e.g. it is sprayed) into recovery boiler flue gases having a temperature of about 300–800° C., and typically flowing in the heat recovery section of a recovery boiler, in order to oxidize nitrogen oxides.

DETAILED DESCRIPTION

A central aspect of the present invention is that, in the removal of nitrogen oxides from flue gases, a chemical (i.e. peroxide) is used which may also be used for other purposes in the pulp mill, for example in the bleaching of pulp. Usually, hydrogen peroxide is used in the practice of the invention, but other conventional peroxides are acceptable too. An advantage provided by peroxide is that it reacts quickly with nitrogen monoxide, producing nitrogen dioxide, according to the reaction $NO+H_2O_2 \rightarrow NO_2+H_2O$. The retention time in the reaction zone need only be between about 0.5–5 seconds, preferably about 1–2 seconds. The use of peroxide does not cause undesirable chemical residues in the process waters of the mill.

The flue gases of the recovery boiler are transported from the furnace to contact different heat transfer equipment, superheaters, the boiler bank, and economizers, thus recovering the heat contained in the gases into the water, steam, or mixtures thereof flowing in the heat transfer equipment. The boiler bank of the boiler and the economizer comprise heat transfer members formed by heat transfer elements inside of which the boiler feed water to be heated flows. Typically, there is free or open space for the flue gas flow in the boiler bank and in the economizer between the heat transfer elements. While the flue gas flows past the heat transfer elements heat is transferred to the feed water flowing inside the elements. In order to practice the method of the invention, peroxide solution is sprayed into the flue gases when they have a temperature of between about 300–800° C., a conventional temperature when they flow through the boiler bank and the economizer. The peroxide is preferably added in the conventional flue gas duct between the boiler bank and the economizer where the most preferred temperature range (between about 400–600° C.) prevails. Peroxide solution may be added at more than one point in the region of the boiler bank and the economizer.

The peroxide solution utilized typically comprises about 1–35% hydrogen peroxide in water, e.g. between about 5–20%. The amount of peroxide used is at least the stoichiometric amount, typically between about 1.1–2 times the stoichiometric amount. The introduction of the peroxide results in the conversion of the majority of NOXs in the flue gases to $N_2O_2$, typically 60–90%, but possibly even more than 90%. For example if the $No_x$ content of the flue gases is about 100–150 ppm, the invention reduces it to about 30–40 ppm.

The treated flue gases from the recovery boiler are preferably transported from the economizer (in a manner known per se) via a flue gas outlet to a wet scrubber downstream of the recovery boiler. In the scrubber, the flue gases are scrubbed, according to the invention, with an alkaline solution containing for example sodium hydroxide or potassium hydroxide, in order to bind nitrogen dioxide, thus producing nitrate, for example sodium nitrate or potassium nitrate. The scrubbing solution preferably is an alkaline solution used in the mill, such as white liquor, or oxidized white liquor, or alkaline condensate from the pulp mill evaporation plant. The alkaline liquid preferably has a pH of greater than 9, e.g. between about 10–11.5, and converts more than half of the $NO_2$ to nitrate (e.g. more than 90%). Also according to the invention, the nitrate-containing scrubbing solution may be transported to the biological effluent treatment plant of the pulp mill where the nitrate is used as a nutrient.

An advantage provided by the invention is that it is simple to practice. No remarkable new apparatus is needed to carry out the invention. When peroxide and alkaline solutions are used, no harmful chemical residues are produced, such as are produced when chlorine dioxide is used.

In the above description all narrower ranges within a broad range are also specifically included. For example 400–600° C. means 410–510, 450–600, 500–598, and all other narrower ranges within the broad range.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of removing nitrogen oxides from flue gases of a cellulose pulp mill recovery boiler having a boiler bank and an economizer in a heat recovery section, comprising:

(a) discharging flue gases from a cellulose pulp mill recovery boiler, the gases having nitrogen oxides therein, into a heat recovery section of the recovery boiler;

(b) at a location where the flue gases have a temperature between about 300–800° C., spraying a peroxide solution into contact with the flue gases so as to oxidize nitrogen oxides in the flue gases; and wherein (b) is practiced at least in part by spraying peroxide solution into a duct between the boiler bank and the economizer of the heat recovery section of the recovery boiler.

2. A method as recited in claim 1 wherein (b) is practiced where the temperature of the flue gases is between about 400–600° C.

3. A method as recited in claim 2 wherein (b) is further practiced to retain the peroxide solution in contact with the flue gases for a time period of between about 0.5–5 seconds.

4. A method as recited in claim 2 wherein (b) is further practiced to retain the peroxide solution in contact with the flue gases for a time period of between about 1–2 seconds.

5. A method as recited in claim 3 wherein during the practice of (b) nitrogen dioxide is produced; and further comprising (c) recovering the nitrogen dioxide produced during (b) utilizing a wet scrubber downstream of the recovery boiler.

6. A method as recited in claim 5 wherein (c) is practiced utilizing an alkaline liquor as the scrubbing liquor in the wet scrubber so as to produce nitrate from the nitrogen dioxide.

7. A method as recited in claim 6 further comprising (d) feeding the nitrate from (c) to a biological effluent treatment plant of the pulp mill so that the nitrate is used as a nutrient in the biological effluent treatment plant.

8. A method as recited in claim 6 wherein the scrubbing alkaline solution is condensate from an evaporation plant of the pulp mill.

9. A method as recited in claim 6 wherein (b) is practiced by spraying a peroxide solution having a concentration of between about 5–20% peroxide in water into at least one portion of the heat recovery section of the recovery boiler.

10. A method as recited in claim 1 wherein (b) is practiced by spraying a peroxide solution having between about 1.1–2 times the stoichiometric amount of peroxide into at least one portion of the heat recovery section of the recovery boiler.

11. A method as recited in claim 10 wherein (b) is further practiced to retain the peroxide solution in contact with the flue gases for a time period of between about 0.5–5 seconds.

12. A method as recited in claim 1 wherein (b) is further practiced to retain the peroxide solution in contact with the flue gases for a time period of between about 1–2 seconds.

13. A method as recited in claim 10 wherein (b) is practiced to change the majority of the nitrogen oxides in the flue gases into nitrogen dioxide.

14. A method as recited in claim 1 wherein (b) is further practiced by spraying a hydrogen peroxide solution comprising between about 1–35% hydrogen peroxide in water.

15. A method as recited in claim 1 wherein during the practice of (b) nitrogen dioxide is produced; and further comprising (c) recovering the nitrogen dioxide produced during (b) utilizing a wet scrubber downstream of the recovery boiler; and wherein (c) is practiced utilizing an alkaline liquor as the scrubbing liquor or in the wet scrubber so as to produce nitrate from the nitrogen dioxide.

16. A method as recited in claim 15 wherein (c) is further practiced using an alkaline scrubbing liquor having a pH of between about 10–11.5.

17. A method as recited in claim 1 wherein (b) is practiced to convert at least about 60–90% of the nitrogen oxides in the flue gases to nitrogen dioxide; and comprising the further step (c) of removing the nitrogen dioxides from the flue gases downstream of the recovery boiler heat recovery section.

18. A method as recited in claim 17 wherein (c) is practiced by bringing the flue gases into contact with an alkaline liquor, used elsewhere in the pulp mill, having a pH of greater than 9, to convert a majority of the nitrogen dioxide to nitrate; and (d) utilizing the nitrate from (c) as nutrient in a biological effluent treatment plant of the pulp mill.

* * * * *